United States Patent
Jo et al.

(10) Patent No.: US 9,389,740 B2
(45) Date of Patent: Jul. 12, 2016

(54) TOUCH SENSING APPARATUS AND METHOD CAPABLE OF SUPPORTING HOVER SENSING

(71) Applicant: SAMSUNG ELECTRO-MECHANICS CO., LTD., Suwon-Si (KR)

(72) Inventors: Byeong Hak Jo, Suwon-Si (KR); Moon Suk Jeong, Suwon-Si (KR); Yong Il Kwon, Suwon-Si (KR); Tah Joon Park, Suwon-Si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 245 days.

(21) Appl. No.: 14/314,867

(22) Filed: Jun. 25, 2014

(65) Prior Publication Data

US 2015/0029141 A1 Jan. 29, 2015

(30) Foreign Application Priority Data

Jul. 29, 2013 (KR) ........................ 10-2013-0089602

(51) Int. Cl.
*G06F 3/044* (2006.01)

(52) U.S. Cl.
CPC ...... *G06F 3/044* (2013.01); *G06F 2203/04108* (2013.01)

(58) Field of Classification Search
CPC ........................ G06F 3/044; G06F 2203/04108
See application file for complete search history.

(56) References Cited

U.S. PATENT DOCUMENTS

| | | | |
|---|---|---|---|
| 2008/0158174 A1* | 7/2008 | Land | G06F 3/0418 345/173 |
| 2011/0261007 A1* | 10/2011 | Joharapurkar | G06F 3/0418 345/174 |
| 2012/0217981 A1* | 8/2012 | Erdogan | G01R 27/2605 324/679 |

FOREIGN PATENT DOCUMENTS

| | | |
|---|---|---|
| KR | 10-2011-0042585 | 4/2011 |
| KR | 10-1198359 | 11/2012 |
| WO | 2011/005977 A2 | 1/2011 |

OTHER PUBLICATIONS

Office action dated Aug. 12, 2014 from corresponding Korean Patent Application No. 10-2013-0089602 and its English summary provided by the applicant.

* cited by examiner

*Primary Examiner* — Adam R Giesy
(74) *Attorney, Agent, or Firm* — NSIP Law

(57) ABSTRACT

Disclosed herein is a touch sensing apparatus capable of supporting hover sensing, including: a plurality of capacitance-voltage converters (C-V converters) outputting different voltage values depending on a change in capacitance of each of the sensing electrodes; a plurality of integrators integrating output voltages of each of the C-V converters; a first multiplexer multiplexing outputs of the plurality of integrators; a second multiplexer multiplexing the outputs of the plurality of integrators; a first differential amplification unit for touch sensing receiving an output of the first multiplexer and an output of the second multiplexer; a second differential amplification unit for hover sensing receiving the output of the first multiplexer and the output of the second multiplexer; and a control unit sensing a touch event or a hover event, thereby removing a common noise to accurately sense both the touch event and the hover event.

20 Claims, 10 Drawing Sheets

TOUCH SENSING APPARATUS AND METHOD CAPABLE OF SUPPORTING HOVER SENSING

CROSS REFERENCE TO RELATED APPLICATION

This application claims the benefit of Korean Patent Application No. 10-2013-0089602, filed on Jul. 29, 2013, entitled "Touch Sensing Apparatus And Method Capable Of Supporting Hover Sensing", which is hereby incorporated by reference in its entirety into this application.

BACKGROUND OF THE INVENTION

1. Technical Field

The present invention relates to touch sensing apparatus and method, and more particularly, to touch sensing apparatus and method capable of supporting hover sensing which can sense both a touch event and a hover event.

2. Description of the Related Art

A touch screen is rapidly replacing apparatuses of a button input type due to the convenience and simplicity of use. The touch screen is classified into a resistive type and a capacitive type depending on a method of sensing a touch. These methods each have their advantage and disadvantage. Herein, since the capacitive type has high durability and detects a multi touch, the capacitive type has more frequently been used than the resistive type.

The capacitive type is a type which converts a value of a capacitor changed when a touch panel is touched by a user's hand or a touch pen into a voltage and converts the voltage into a digital to determine whether the touch panel is touched. A method of electrically converting the value of the capacitor into an electrical signal has been also researched variously.

In particular, a method of using an integrator converts and outputs a capacitance of the capacitor into a voltage several times. In this case, the method of using an integrator is relatively more robust against noises than a method of converting a capacitance of a capacitor into a voltage only once, and therefore has been frequently used.

Meanwhile, the touch screen panel is operated by being mounted in a display device, such as a liquid crystal display (LCD) and an organic light emitting display (OLED). In this case, a malfunction may occur at the time of sensing a touch, due to noises introduced from the display device. Further, a circuit (integration circuit) for measuring capacitance may be wrongly operated due to a common noise, such as a power supply noise and an electromagnetic wave noise introduced from the air, an instantaneous noise introduced from a touch pen or a user's hand at the time of touching the touch screen panel, and the like. Further, there is a limitation in increasing a gain of an integrator due to the common noise, and the like, such that it is difficult to support hover sensing capable of sensing a hover event which can detect objects which are present in the vicinity of a touch sensor but are not touched.

Patent Document disclosed in the following Prior Art discloses improved capacitive type touch and hover sensing using a sensor array. The following Patent Document includes an AC ground shield, which is disposed behind the sensor array and is stimulated with a signal having the same waveform as a signal driving the sensor array, to concentrate an electric field extending from the sensor array so as to increase a sensing range of the sensor array, thereby improving the hover sensing capability. However, the following Patent Document has a problem in that since there is a need to dispose a separate AC ground shield behind the sensor array and apply the same signal as the signal driving the sensor array to the AC ground shield so as to improve the hover sensing capability, a manufacturing process of the touch panel may be complicated.

Therefore, a need exists for a touch sensing apparatus which can simultaneously support the touch and hover sensing without needing to perform an additional manufacturing process of a touch panel, accurately sense the touch and hover event, and be operated in analog mode or a digital mode.

PRIOR ART DOCUMENT

Patent Document (Patent Document 1) International Patent Laid-Open Publication No. WO 2011/005977

SUMMARY OF THE INVENTION

The present invention has been made in an effort to provide a touch sensing apparatus capable of accurately sensing both a touch event and a hover event by reducing a common noise and supporting hover sensing which can be operated in an analog mode or a digital mode.

Further, the present invention has been made in an effort to provide a touch sensing method capable of accurately sensing both a touch event and a hover event by reducing a common noise and supporting hover sensing which can be operated in an analog mode or a digital mode.

According to a preferred embodiment of the present invention, there is provided a touch sensing apparatus capable of supporting hover sensing of a touch panel including a plurality of driving electrodes and a plurality of sensing electrodes, including: a plurality of capacitance-voltage converters (C-V converters) outputting different voltage values depending on a change in capacitance of each of the sensing electrodes; a plurality of integrators integrating output voltages of each of the C-V converters; a first multiplexer multiplexing outputs of the plurality of integrators; a second multiplexer multiplexing the outputs of the plurality of integrators; a first differential amplification unit for touch sensing receiving an output of the first multiplexer and an output of the second multiplexer; a second differential amplification unit for hover sensing receiving the output of the first multiplexer and the output of the second multiplexer; and a control unit sensing a touch event or a hover event based on an output of the first differential amplification unit and an output of the second differential amplification unit.

The first differential amplification unit for touch sensing may be operated in a low gain mode and the touch sensing apparatus capable of supporting hover sensing may be operated in a high gain mode.

When the second differential amplification unit is in a saturated state, the control unit may determine that the touch event is generated and sense the touch event based on the output of the first differential amplification unit and when the output of the first differential amplification unit is less than a first level and the output of the second differential amplification unit is equal to or more than a second level, the control unit may determine that the hover event is generated and sense the hover event based on the output of the second differential amplification unit.

The touch sensing apparatus capable of supporting hover sensing may further include: a plurality of sample and hold circuits holding the outputs of each of the integrators for a predetermined time, wherein the first multiplexer and the second multiplexer receive and multiplex the outputs of the plurality of sample and hold circuits.

The first multiplexer and the second multiplexer may each select and output one of the output signals of the plurality of sample and hold circuits.

The first multiplexer and the second multiplexer may select and output the outputs of the sample and hold circuits which process signals of adjacent sensing electrodes among the plurality of sensing electrodes.

Each of the sample and hold circuits may include a function of adjusting a channel offset of the plurality of sensing electrodes.

Each of the sample and hold circuits may include a non-inverting amplifier and the control unit may adjust an amplification factor of the non-inverting amplifier to adjust an output level so as to adjust the channel offset of the plurality of sensing electrodes.

The touch sensing apparatus capable of supporting hover sensing may further include: a first analog-to-digital converter converting the output of the first differential amplification unit into a digital data and a second analog-to-digital converter converting the output of the second differential amplification unit into the digital data, wherein the control unit includes a digital signal processing unit which receives the output of the first analog-to-digital converter and the output of the second analog-to-digital converter to sense the touch event and the hover event.

In an analog mode, the first differential amplification unit and the second differential amplification unit may each subtract, amplify, and output signals of adjacent channels depending on a control signal of the digital signal processing unit, the first analog-to-digital converter and the second analog-to-digital converter may each convert the outputs of the first differential amplification unit and the second differential amplification unit into the digital data, and the digital signal processing unit may sense the touch event or the hover event based on the digital data, and in a digital mode, the first differential amplification unit and the second differential amplification unit may each subtract, amplify, and output a predetermined reference voltage and signals of channels sequentially input depending on the control signal of the digital signal processing unit, the first analog-to-digital converter and the second analog-to-digital converter may each convert the outputs of the first differential amplification unit and the second differential amplification unit into the digital data, and the digital signal processing unit may sense the touch event or the hover event based on the digital data.

Each of the C-V converters may include: a first switch of which the one terminal is connected to the sensing electrode; a second switch of which the one terminal is connected to the sensing electrode and the other terminal is applied with a predetermined first voltage; a first operational amplifier of which the inverting input terminal is connected to the other terminal of the first switch and the non-inverting terminal is applied with the first voltage; a first capacitor connected between the non-inverting input terminal and an output terminal of the first operational amplifier; and a third switch connected to the first capacitor in parallel.

Each of the integrators may include: a second capacitor of which the one terminal is connected to an output of the first operational amplifier; a fourth switch of which the one terminal is connected to the other terminal of the second capacitor; a fifth switch of which the one terminal is connected to the other terminal of the second capacitor and the other terminal is applied with the first voltage; a second operational amplifier of which the inverting input terminal is connected to the other terminal of the fourth switch and the non-inverting terminal is applied with the first voltage; a third capacitor connected between the non-inverting input terminal and an output terminal of the second operational amplifier; and a sixth switch connected to the third capacitor in parallel.

Each of the sample and hold circuits may include: a seventh switch of which the one terminal is connected to an output of the second operational amplifier; a third operational amplifier of which the inverting input terminal is connected to the other terminal of the seventh switch; a first resistor of which the one terminal is connected to a non-inverting input terminal of the third operational amplifier and the other terminal is connected to a ground; a second resistor connected between the non-inverting input terminal and an output terminal of the third operational amplifier and having a resistance value changed depending on a control signal of the control unit; a fourth capacitor connected between the non-inverting input terminal of the third operational amplifier and a ground; and a switch connected to the fourth capacitor in parallel.

The first differential amplification unit and the second differential amplification unit may each include: a third resistor of which the one terminal is connected to the output of the first multiplexer; a fourth operational amplifier of which the non-inverting input terminal is connected to the other terminal of the third resistor; a fourth resistor of which the one terminal is applied with the first voltage and the other terminal is connected to the non-inverting input terminal of the fourth operational amplifier and having a resistance value changed depending on the control signal of the control unit; an eighth switch of which the one terminal is connected to the output of the second multiplexer; a ninth switch of which the one terminal is applied with a predetermined reference voltage and the other terminal is connected to the other terminal of the eighth switch; a fifth resistor of which the one terminal is connected to the other terminal of the eighth switch and the other terminal of the ninth switch and the other terminal is connected to the non-inverting input terminal of the fourth operational amplifier; and a sixth resistor connected between the non-inverting input terminal and an output terminal of the fourth operational amplifier and having a resistance value changed depending on the control signal of the control unit.

According to another preferred embodiment of the present invention, there is provided a touch sensing method capable of supporting hover sensing of a touch sensing apparatus including a plurality of capacitance-voltage converters (C-V converters) outputting different voltage values depending on a change in capacitance of each of the sensing electrodes, a plurality of integrators integrating output voltages of each of the C-V converters, a first multiplexer multiplexing outputs of the plurality of integrators, a second multiplexer multiplexing the outputs of the plurality of integrators, a first differential amplification unit for touch sensing receiving an output of the first multiplexer and an output of the second multiplexer, a second differential amplification unit for hover sensing receiving the output of the first multiplexer and the output of the second multiplexer, a first analog-to-digital converter converting the output of the first differential amplification unit into a digital data, a second analog-to-digital converter converting the output of the second differential amplification unit into the digital data, and a digital signal processing unit receiving the outputs of the first analog-to-digital converter and the second analog-to-digital converter to sense a touch event and a hover event, the touch sensing method including: (A) determining whether the mode selected by a user is an analog mode or a digital mode by the digital signal processing unit; (B) in the step (A), when it is determined that the mode selected by the user is the analog mode, subtracting, amplifying, and outputting, by each of the first differential amplification unit and the second differential amplification unit, input signals, depending on a control signal of the digital signal processing unit; (C) converting, by each of the first analog-to-digital converter and the second analog-to-digital converter, the outputs of the first differential amplification unit and the second differential amplification unit into the digital data; (D) sensing, by the digital signal processing unit, the touch event or the hover event based on the digital data; (E) in the step (A), when it is determined that the mode selected by the user is the digital mode, subtracting, amplifying, and outputting, by each of the first differential amplification unit and the second differential amplification unit, the input signals of the channels and a predetermined reference voltage, depending on a control signal of the digital signal processing unit; (F) converting, by each of the first analog-to-digital converter and the second analog-to-digital converter, the outputs of the first differential amplification unit and the second differential amplification unit into the digital data; and (G) when the digital signal processing unit receives the data of the two channels, subtracting the data of the two channels and sensing the touch event or the hover event based on the subtracted result.

The first differential amplification unit may be operated in a low gain mode and the second differential amplification unit may be operated in a high gain mode.

When the second differential amplification unit is in a saturated state, the digital signal processing unit may determine that the touch event is generated and sense the touch event based on the output of the first differential amplification unit and when the output of the first differential amplification unit is less than a first level and the output of the second differential amplification unit is equal to or more than a second level, the control unit may determine that the hover event is generated and sense the hover event based on the output of the second differential amplification unit.

The touch sensing apparatus capable of supporting hover sensing may further include a plurality of sample and hold circuits holding the outputs of each of the integrators for a predetermined time and the first multiplexer and the second multiplexer may receive and multiplex the outputs of the plurality of sample and hold circuits.

The first multiplexer and the second multiplexer may select and output the outputs of the sample and hold circuits which process signals of adjacent sensing electrodes among the plurality of sensing electrodes, in the step (B), the first differential amplification unit and the second differential amplification unit may each subtract, amplify, and output signals of adjacent channels output from the first multiplexer and the second multiplexer, and in the step (G), the two channels may include the adjacent channels.

Each of the sample and hold circuits may include a function of adjusting a channel offset of the plurality of sensing electrodes.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
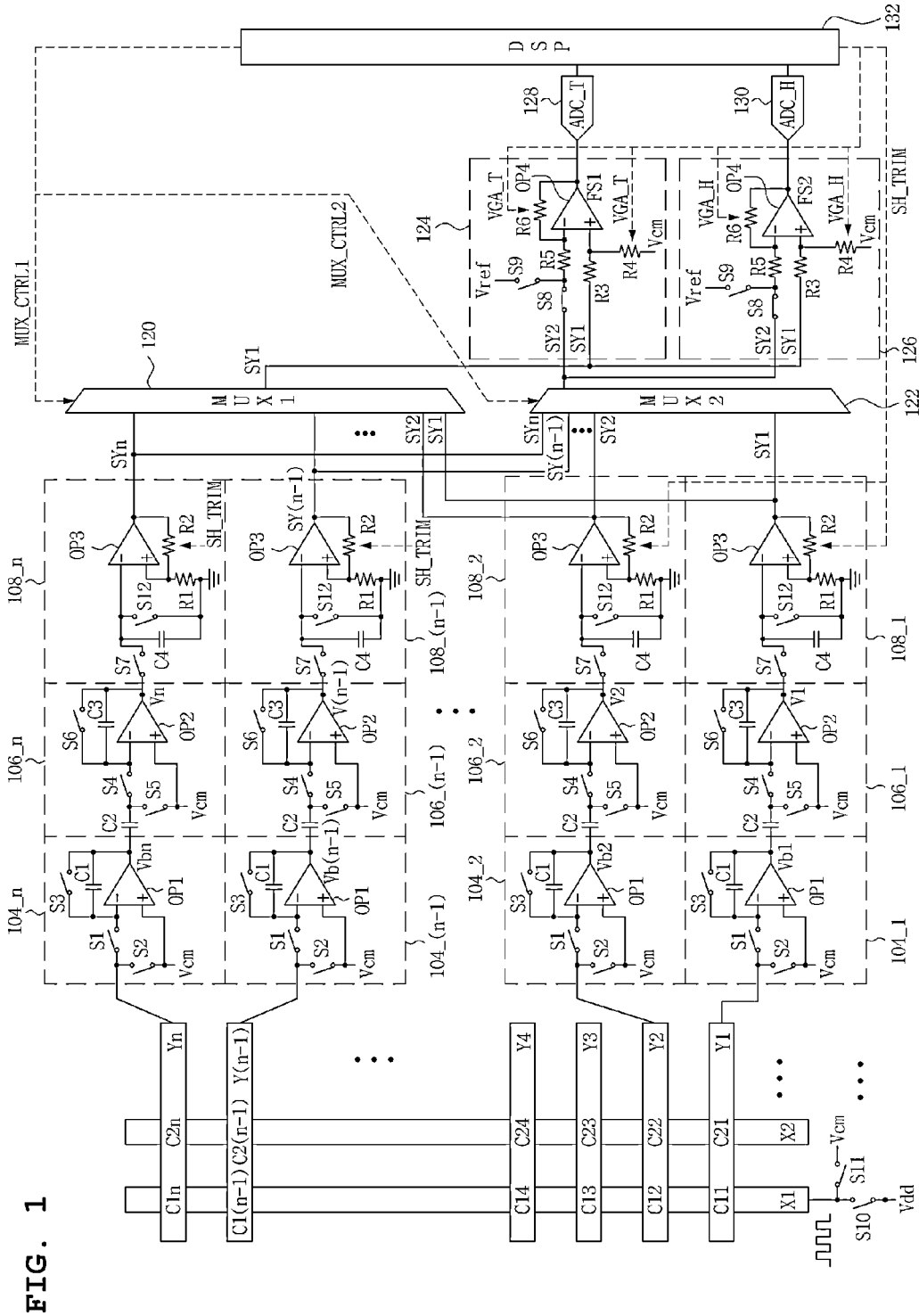
FIG. 1 is a block diagram of a touch sensing apparatus capable of supporting hover sensing according to a preferred embodiment of the present invention, which is operated in an analog mode.

The objects, features and advantages of the present invention will be more clearly understood from the following detailed description of the preferred embodiments taken in conjunction with the accompanying drawings. Throughout the accompanying drawings, the same reference numerals are used to designate the same or similar components, and redundant descriptions thereof are omitted. Further, in the following description, the terms "first", "second", "one side", "the other side" and the like are used to differentiate a certain component from other components, but the configuration of such components should not be construed to be limited by the terms. Further, in the description of the present invention, when it is determined that the detailed description of the related art would obscure the gist of the present invention, the description thereof will be omitted.

Hereinafter, preferred embodiments of the present invention will be described in detail with reference to the attached drawings.

FIG. 1 is a block diagram of a touch sensing apparatus capable of supporting a hover mode according to a preferred embodiment of the present invention.

Hereinafter, the touch sensing apparatus capable of supporting a hover mode according to the preferred embodiment of the present invention will be described with reference to FIG. 1.

The touch sensing apparatus capable of supporting a hover mode according to the preferred embodiment of the present invention illustrated in FIG. 1 includes a plurality of capacitance-voltage converters (C-V converter) 104_1 to 104_$n$ which are connected to a plurality of sensing electrodes Y1, Y2, ..., Yn, respectively and outputs different voltage values depending on a change in capacitance of each of the sensing electrodes, a plurality of integrators 106_1 to 106_n which integrate an output voltage of each of the C-V converters 104_1 to 104_n, a plurality of sample and hold circuits 108_1 to 108_n which hold outputs of each of the integrators 106_1 to 106_n for a predetermined time, a first multiplexer 120 which multiplexes outputs of the plurality of sample and hold circuits 108_1 to 108_n, a second multiplexer 122 which multiplexes the outputs of the plurality of sample and hold circuits 108_1 to 108_n, a first differential amplification unit 124 for touch sensing which receives an output of the first multiplexer 120 and an output of the second multiplexer 122, a second differential amplification unit 126 for hover sensing which receives the output of the first multiplexer 120 and the output of the second multiplexer 122, and a digital signal processing unit 132 which serves as a control unit sensing a touch event or a hover event based on an output of the first differential amplification unit 124 and an output of the second differential amplification unit 126.

Further, the touch sensing apparatus capable of supporting hover sensing according to the preferred embodiment of the present invention further includes a first analog-to-digital converter 128 which converts the output of the first differential amplification unit 124 into a digital data and a second analog-to-digital converter 130 which converts the output of the second differential amplification unit 126 into the digital data, in which the digital signal processing unit 132 receives outputs of the first analog-to-digital converter 128 and the second analog-to-digital converter 130 to sense the touch event and the hover event.

Each of the C-V converters 104_1 to 104_n includes a first switch S1 of which the one terminal is connected to the sensing electrodes Y1, Y2, . . . , Yn, a second switch S2 of which the one terminal is connected to the sensing electrodes Y1, Y2, . . . , Yn and the other terminal is applied with a predetermined first voltage Vcm, a first operational amplifier OP1 of which the inverting input terminal is connected to the other terminal of the first switch S1 and the non-inverting input terminal is applied with the first voltage Vcm, a first capacitor C1 which is connected between the non-inverting input terminal and an output terminal of the first operational amplifier OP1, and a third switch S3 which is connected to the first capacitor C1 in parallel.

Further, each of the integrators 106_1 to 106_n includes a second capacitor C2 of which the one terminal is connected to the output of the first operational amplifier OP1, a fourth switch S4 of which the one terminal is connected to the other terminal of the second capacitor C2, a fifth switch S5 of which the one terminal is connected to the other terminal of the second capacitor C2 and the other terminal is applied with the first voltage Vcm, a second operational amplifier OP2 which the inverting input terminal is connected to the other terminal of the fourth switch S4 and the non-inverting input terminal is applied with the first voltage Vcm, a third capacitor C3 which is connected between the non-inverting input terminal and an output terminal of the second operational amplifier OP2, and a sixth switch S6 which is connected to the third capacitor C3 in parallel.

Further, each of the sample and hold circuits 108_1 to 108_n includes a seventh switch S7 of which the one terminal is connected to an output of the second operational amplifier OP2, a third operational amplifier OP3 of which the inverting input terminal is connected to the other terminal of the seventh switch S7, a first resistor R1 of which the one terminal is connected to the non-inverting input terminal of the third operational amplifier OP3 and the other terminal is connected to a ground, a second resistor R2 of which is connected between a non-inverting input terminal and an output terminal of the third operational amplifier OP3 and has a resistance value changed depending on a control signal of the digital signal processing unit 132, a fourth capacitor C4 which is connected between the non-inverting input terminal of the third operational amplifier OP3 and a ground, and a twelfth switch S12 which is connected to the fourth capacitor C4 in parallel.

Further, the first differential amplifier 124 and the second differential amplification unit 126 each include a third resistor R3 of which the one terminal is connected to the output of the first multiplexer 120, a fourth operational amplifier OP4 of which the non-inverting input terminal is connected to the other terminal of the third resistor R3, a fourth resistor R4 of which the one terminal is applied with the first voltage Vcm and the other terminal is connected to the non-inverting input terminal of the fourth operational amplifier OP4 and has a resistance value changed depending on the control signal of the digital signal processing unit 132, an eighth switch S8 of which the one terminal is connected to the output of the second multiplexer 124, a ninth switch S9 of which the one terminal is applied with a predetermined reference voltage Vref and the other terminal is connected to the other terminal of the eighth switch S8, a fifth resistor R5 of which the one terminal is connected to the other terminals of the eighth switch S8 and the ninth switch S9 and the other terminal is connected to the non-inverting input terminal of the fourth operational amplifier OP4, and a sixth resistor R6 which is connected between the non-inverting input terminal and an output terminal of the fourth operational amplifier OP4 and has a resistance value changed depending on the control signal of the digital signal processing unit 132.

An operation of the touch sensing apparatus capable of supporting hover sensing according to the preferred embodiment of the present invention configured as described above will be described below.

The touch sensing apparatus capable of supporting hover sensing according to the preferred embodiment of the present invention illustrated in FIG. 1 may be operated in an analog mode or a digital mode depending on a user selection.

In FIG. 1, the eighth switch S8 and the ninth switch S9 are closed or opened depending on the control signal (not illustrated) of the digital signal processing unit 132. When the eighth switch S8 is closed and the ninth switch S9 is opened, the touch sensing apparatus capable of supporting hover sensing according to the preferred embodiment of the present invention is operated in the analog mode and when the eighth switch S8 is opened and the ninth switch S9 is closed, the touch sensing apparatus capable of supporting hover sensing according to the preferred embodiment of the present invention is operated in the digital mode.

In FIG. 1, since the eighth switch S8 is closed and the ninth switch S9 is opened, the touch sensing apparatus of FIG. 1 is operated in the analog mode.

First, an operation in the analog mode will be described.

Analog Mode Operation

In the touch sensing apparatus capable of supporting hover sensing according to the preferred embodiment of the present invention, the first differential amplification unit 124 is a differential amplification unit for touch sensing which senses a touch event and the differential amplification unit 126 is a differential amplification unit for hover sensing for sensing a hover event. The touch event means that a touch sensor is directly touched by objects, such as a user's finger or a touch pen and the hover event means that the objects, such as the finger or the touch pen, are present in the vicinity of the touch sensor but are not touched.

The first differential amplification unit 124 is set with a low amplification gain to be operated at a low gain mode so as to sense the touch event and the second differential amplification unit 126 is set with a high amplification gain to be operated at a high gain mode so as to sensing the hover event.

When the touch sensor is a touch event which is directly touched by objects, such as a user's finger or a touch pen, since a signal level is increased enough to sense the change in capacitance, the touch event may be sensed even though the amplification gain is set to be low. As a result, the first differential amplification unit 124 needs not to be in a saturated state by setting the amplification gain of the first differential amplification unit 124 for sensing the touch event to be low.

On the other hand, in the case of the hover event in which the objects, such as a finger or a touch pen are in the vicinity of the touch sensor but are not touched, since the change in capacitance is weak, the hover event may be sensed only when the amplification is made by increasing the amplification gain. As a result, the amplification gain of the second differential amplification unit 126 is set to be high.

Generally, in the case of the hover event, since the change in capacitance is weak, there is a need to increase the amplification gain so as to sense the hover event. However, since noises introduced from the display device, noises introduced from the air, and the like are present in channels, it is not easy to sense the hover event.

Generally, signals of adjacent channels have the same common noise. Therefore, according to the preferred embodiment of the present invention, after the common noise is removed by subtracting the signals of the adjacent channels and then the signal without an affect due to the common noise is amplified with the high amplification gain, thereby sensing the hover event.

Further, according to the preferred embodiment of the present invention, the instantaneous touch noise introduced from the touch pen or the finger at the time of touch is removed by using the integrator, such that the touch event may be accurately sensed.

According to the preferred embodiment of the present invention, since the amplification is made by the differential amplification unit in the state in which noises are not present, even when the signal-to-noise ratio is increased and the touch signal is weak, the hover event, and the like, may be sensed.

Referring to FIG. 1, since in the analog mode, the eighth switch S8 is closed, the signals of the adjacent channels output from the first multiplexer 120 and the second multiplexer 122 are each input to the first differential amplification unit 124 and the second differential amplification unit 126.

The first differential amplification unit 124 and the second differential amplification unit 126 subtract the signals of the adjacent channels and then amplify the subtracted signals based on control signals VGA_T and VGA_H of the digital signal processing unit 132 and each amplification gain and output the amplified signals to the first analog-to-digital converter 128 and the second analog-to-digital converter 130. The digital signal processing unit 132 senses the touch event or the hover event based on the digital data output from the first analog-to-digital converter 128 and the second analog-to-digital converter 130.

According to the preferred embodiment of the present invention, the channel means each of the sensing electrodes Y1 to Yn and the adjacent channel means the sensing electrodes which are adjacent to each other, such as Y1 and Y2, Y2 and Y3, and the like.

Hereinafter, the analog mode operation of the touch sensing apparatus capable of supporting hover sensing illustrated in FIG. 1 will be described.

Hereinafter, for the convenience of explanation, an operation which is associated with a first driving electrode X1, a second driving electrode X2, a first sensing electrode Y1, and a second sensing electrode Y2 will be described.

Figure 2:
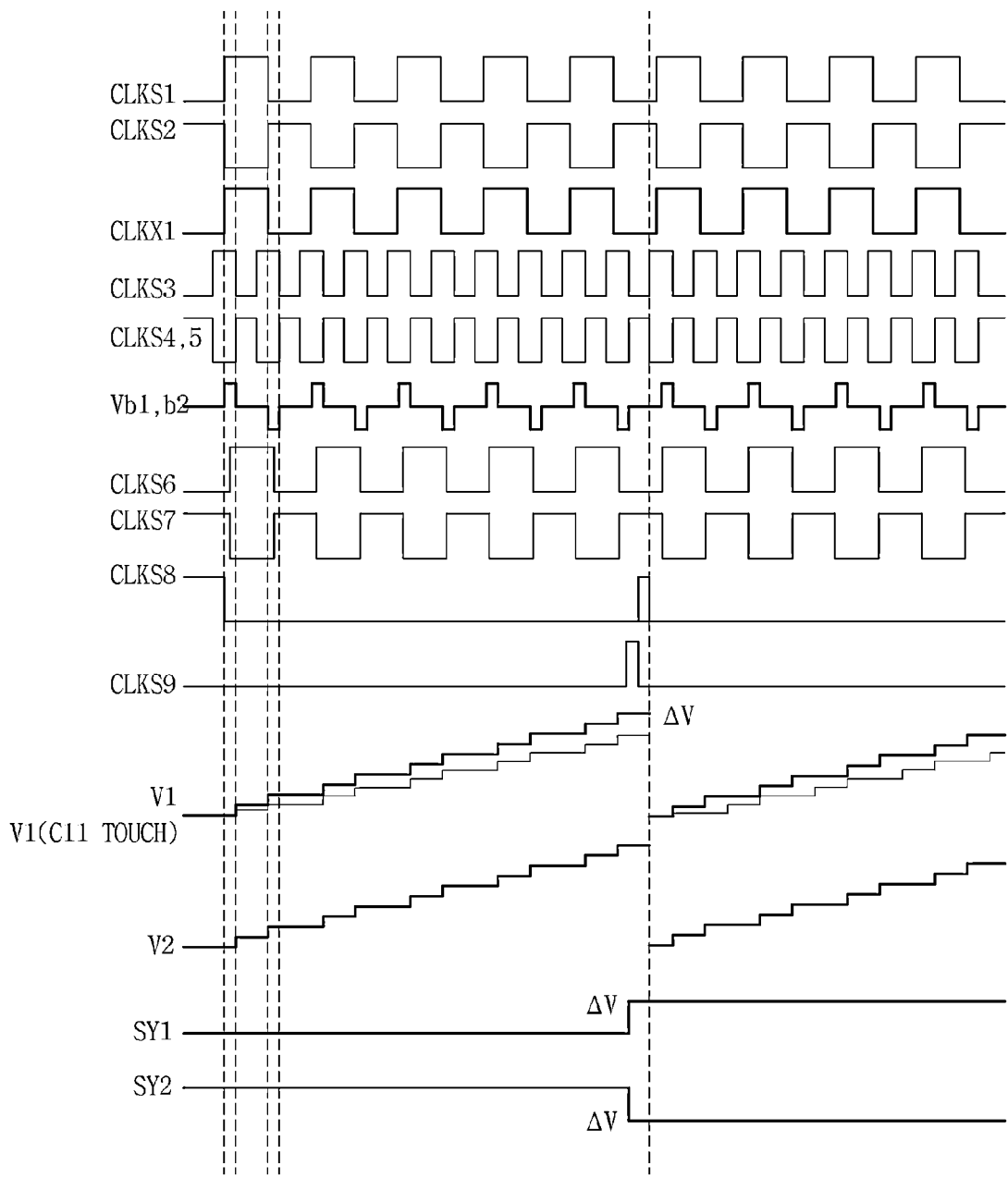
FIG. 2 is a clock diagram for describing an operation of the touch sensing apparatus capable of supporting hover sensing illustrated in FIG. 1.

The plurality of driving electrodes X1, X2, . . . are applied with a driving clock represented by CLKX illustrated in FIG. 2 by a tenth switch S10 and an eleventh switch S11 and are applied with a clock represented by CLKS1 to CLKS9 illustrated in FIG. 2 through the first switch 51 to the ninth switch S9. The twelfth switch S12 which is present in the sample and hold circuits 108_1 and 108_2 is a switch which resets the fourth capacitor C4 at the time of processing a signal of a new channel. The first switch S1 to the twelfth switch S12 may be configured of transistors and may be controlled depending on the control signal output from the digital signal processing unit 132.

When a pulse of a predetermined frequency is applied to the first driving electrode X1, charges are charged in adjacent nodes C11 and C12 and Vb1 and Vb2 are output from the first C-V converter 104_1 and the second C-V converter 104_2 by the charges. The first C-V converter 104_1 and the second C-V converter 104_2 output different voltage values depending on the change in capacitance of the sensing electrode. In this case, the second sensing electrode X2 holds a reference voltage so as to shield noises.

At the time of driving the first driving electrode X1, the first C-V converter 104_1 and the second C-V converter 104_2 which are each connected to the first sensing electrode Y1 and the second sensing electrode Y2 are operated at the same clock and thus have an in-phase output.

When in the analog mode, a touch or noises are not present, the adjacent nodes C11 and C12 have substantially the same value and therefore Vb1=Vb2. Since Vb1=Vb2, an output V1 of a first integrator 106_1 and an output V2 of a second integrator 106_2 are the same and an output SY1 of a first sample and hold circuit 108_1 and an output SY2 of a second sample and hold circuit 108_2 are also the same. Therefore, 0 is output from the first differential amplification unit 124 and the second differential amplification unit 126 and the digital signal processing unit 132 may sense that the touch event is not generated, based on the output.

When in the analog mode, the touch event is generated in the C11, for example, when the C11 is touched, the first differential amplification unit 124 and the second differential amplification unit 126 each subtract the signal SY2 associated with the second channel from the signal SY1 associated with the first channel as being represented by the following Equation 1 and then amplify the subtracted signal to output a signal FS 1.

$$FS1 = (SY1 - SY2) \times (R4/R3) + Vcm \quad \text{[Equation 1]}$$

In the above Equation 1, it is assumed that the third resistor R3 and the fifth resistor R5 have the same resistance value and the fourth resistor R4 and the sixth resistor R6 also have the same resistance value and it is assumed that the Vcm is a predetermined first voltage.

Since the touch sensing apparatus capable of supporting hover sensing according to the preferred embodiment of the present invention illustrated in FIG. 1 subtracts, amplifies, and outputs the signals of the adjacent channels at the time of the analog mode operation, the number of channel data which is output from each of the differential amplification units 124 and 126 to the digital signal processing unit 132 generally becomes 'total number of channels—1'. That is, when 40 channels are present, a total of 39 channel data are sequentially output from each of the differential amplification units 124 and 126 to the digital signal processing unit 132 at the time of the analog mode operation.

At the time of the analog mode operation, the sensing apparatus according to the preferred embodiment of the present invention may effectively remove the common noise commonly introduced into the channels since the signals of the adjacent channels are subtracted. Further, since the signal from which the common noise is removed is converted into the digital data in the analog-to-digital converter, the analog-to-digital conversion error due to noises may be reduced and the signal-to-noise ratio may be increased.

Further, when the hover event is generated, even though the change in capacitance is weak, since the second differential amplification unit 126 which takes charge of the sensing of the hover event subtracts the signals of the adjacent channels to remove the common noise and then amplifies and outputs the subtracted signal with the high amplification gain, the digital signal processing unit 132 may accurately sense the hover event based on the signal.

Further, when the touch event is generated, since the signal level is high enough to differentiate the change in capacitance, the first differential amplification unit 124 which takes charge of the sensing of the touch event is operated at a low gain mode and thus is operated without being in a saturated state. The first differential amplification unit 124 subtracts the signals of the adjacent channels to remove the common noise and then amplifies and outputs the subtracted signal with the low amplification gain and the digital signal processing unit 132 may accurately sense the touch event based on the output signal.

Therefore, at the time of the analog mode operation, the touch sensing apparatus capable of supporting hover sensing may accurately sense both the touch event and the hover event.

The analog mode operation as described above will be described in detail.

Figure 3A:
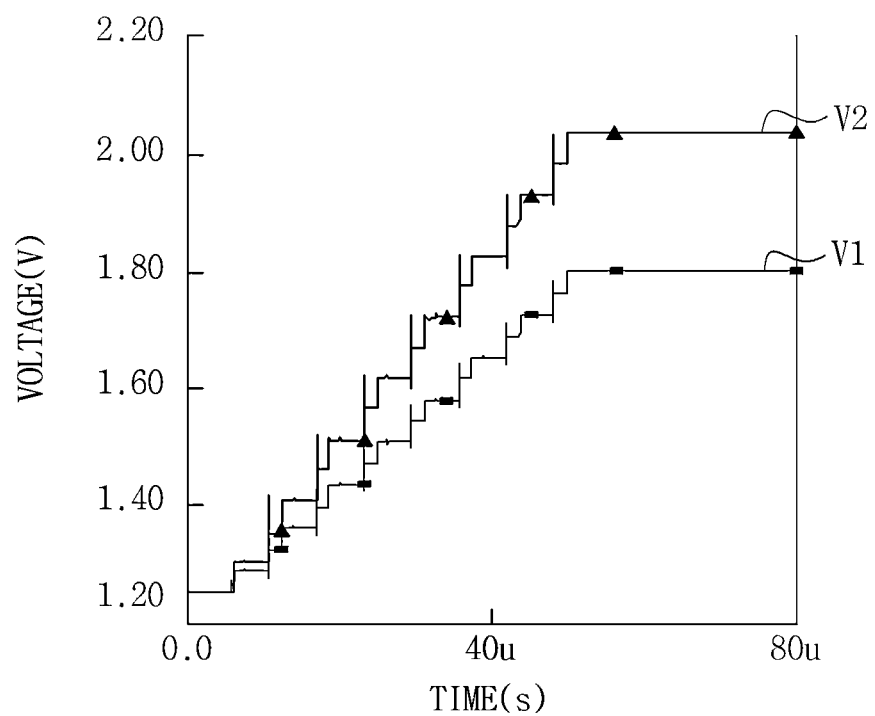
FIG. 3A is a diagram illustrating an output of an integrator at the time of sensing a touch.

When in the analog mode, the C11 is touched, that is, when the touch event is generated in the C11, as illustrated in FIG. 3A, the V1 which is the output of the first integrator 106_1 is output at a voltage lower than a voltage when the touch is not made at the C11 due to the reduction in capacitance and the V2 which is the output of the second integrator 106_2 is output at an original voltage when the touch is not made.

The output V1 of a first integrator 106_1 and the output V2 of a second integrator 106_2 are each input to the first sample and hold circuit 108_1 and the second sample and hold circuit 108_2. The first sample and hold circuit 108_1 and the second sample and hold circuit 108_2 each hold the outputs of the first integrator 106_1 and the second integrator 106_2 for a predetermined time.

Since the first sample and hold circuit 108_1 and the second sample and hold circuit 108_2 have the resistance value of the second resistor R2 changed depending on a control signal SH_TRIM of the digital signal processing unit 132 to control an offset of each channel, it is possible to suppress a deviation from occurring between channel signal levels. Further, since the first sample and hold circuit 108_1 and the second sample and hold circuit 108_2 hold the input signal for a predetermined time to simultaneously perform the next channel driving and the analog-to-digital conversion operation without waiting for the analog-to-digital conversion operation time, the overall sensing time and current consumption may be reduced at the time of processing a multi-channel signal. The switch S12 which is present in the sample and hold circuits 108_1 and 108_2 is a switch which resets the fourth capacitor C4 at the time of processing a signal of a new channel.

The first multiplexer 120 and the second multiplexer 122 are each input with the output SY1 of the first sample and hold circuit 108_1 to an output SYn of an n-th sample and hold circuit 108_n. The first multiplexer 120 selects and outputs the SY1 which is one of the input signals SY1 to SYn depending on a control signal MUX_CTRL1 of the digital signal processing unit 132 and the second multiplexer 122 selects and outputs the SY2 which is one of the input signals SY1 to SYn depending on a control signal MUX_CTRL2 of the digital signal processing unit 132. That is, the digital signal processing unit 132 controls the first multiplexer 120 and the second multiplexer 122 to output the signals of the adjacent channels corresponding to the adjacent nodes C11 and C12 from the first multiplexer 120 and the second multiplexer 122.

The output SY1 of the first multiplexer 120 and the output SY2 of the second multiplexer 122 are each input to the first differential amplification unit 124 and the second differential amplification unit 126.

Figure 3B:
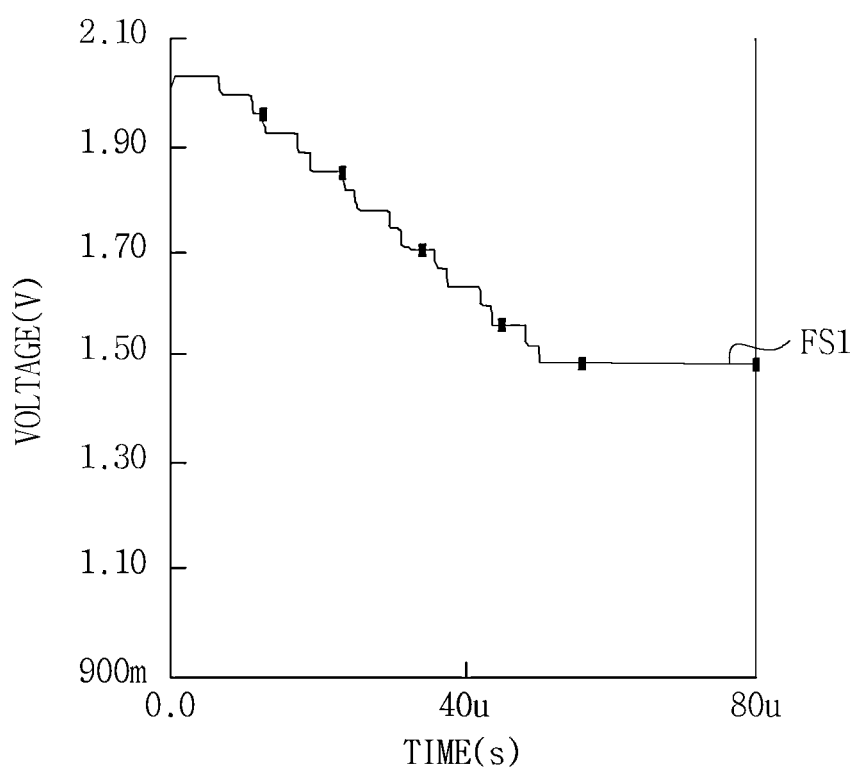
FIG. 3B is a diagram illustrating an output of a differential amplification unit at the time of sensing a touch.

When the touch event is generated at the C11, the first differential amplification unit 124 outputs the signal FS1 as illustrated in FIG. 3B. The signal FS1 output from the first differential amplification unit 124 is converted into the digital data by the first analog-to-digital converter 128, which is in turn input to the digital signal processing unit 132. The digital signal processing unit 132 may discriminate the digital data output from the first analog-to-digital converter 128 to sense that the touch event is generated at the node C11.

Meanwhile, when the touch event is generated, the touch signal level is sufficiently large so that the first differential amplification unit 124 is set with the amplification gain to be operated at a low gain mode. Therefore, at the time of generating the touch event, the first differential amplification unit 124 subtracts the signals of the adjacent channels and amplifies the subtracted signals with the amplification gain, such that the first differential amplification unit 124 may be normally operated without being in the saturated state.

Figure 4A:
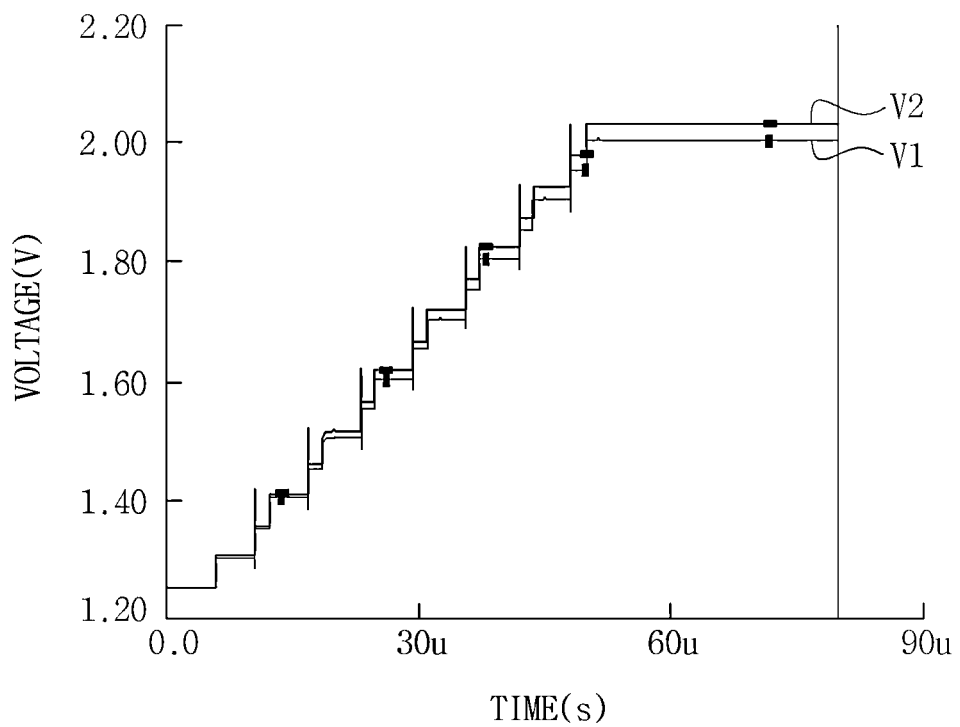
FIG. 4A is a diagram illustrating the output of the integrator at the time of sensing a hover.
Figure 4B:
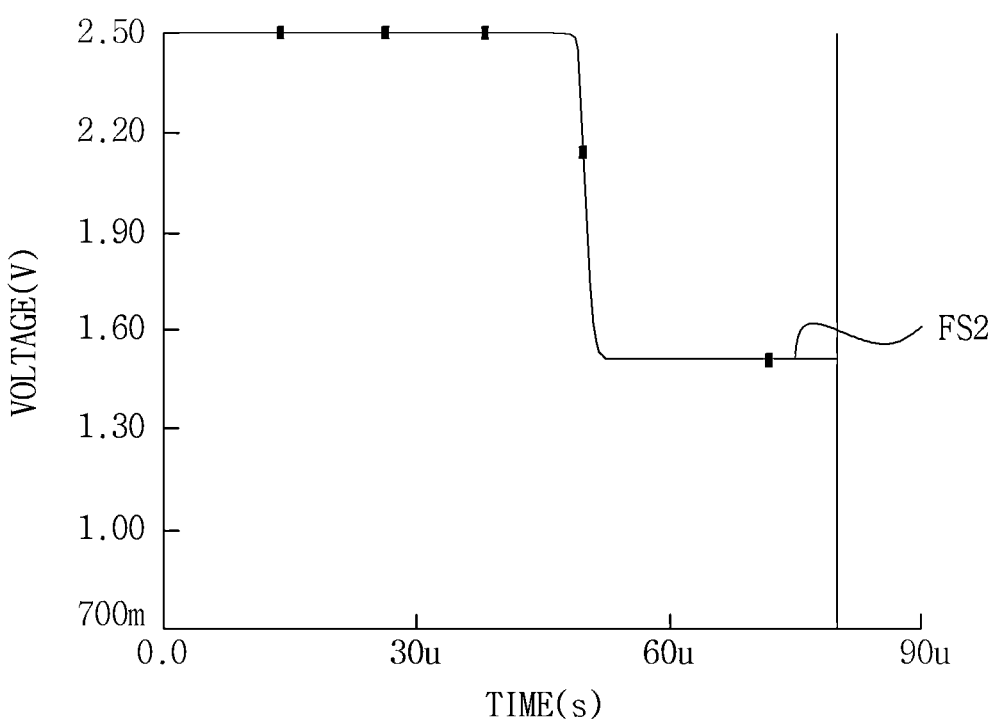
FIG. 4B is a diagram illustrating the output of the differential amplification unit at the time of sensing a hover.

When in the analog mode, the objects are approached in the vicinity of the C11, that is, when the hover event is generated at the C11, as illustrated in FIG. 4A, the output V1 of the first integrator 106_1 is output as a slightly lower voltage than a voltage when the touch is not made due to the reduction in capacitance at the C11 and the output V2 of the second integrator 106_2 is output as the original voltage when the touch is not made, such that second differential amplification unit 126 outputs a signal FS2 as illustrated in FIG. 4B.

When the hover event is generated, even though the change in capacitance is weak, the second differential amplification unit 126 which takes charge of the sensing of the hover event removes the common noise from the signals of the adjacent channels and then amplifies the subtracted signals with the high amplification gain. That is, the second differential amplification unit 126 is operated at a high gain mode to output the signal FS2 having a signal level capable of sufficiently sensing the hover event as illustrated in FIG. 4B.

The signal FS2 output from the second differential amplification unit 126 is converted into the digital data by the second analog-to-digital converter 130, which is in turn input to the digital signal processing unit 132. The digital signal processing unit 132 may discriminate the digital data output from the second analog-to-digital converter 130 to sense that the hover event is generated at the node C11.

Figure 5A:
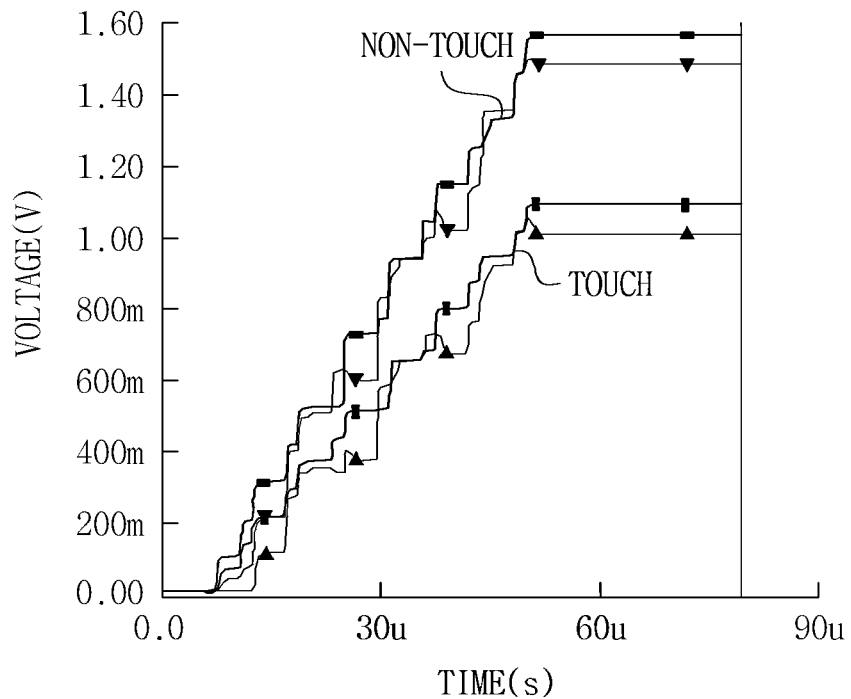
FIG. 5A is a diagram illustrating an output of a sensing apparatus according to the prior art at the time of applying a noise of 90 KHz/5 Vpp.
Figure 5B:
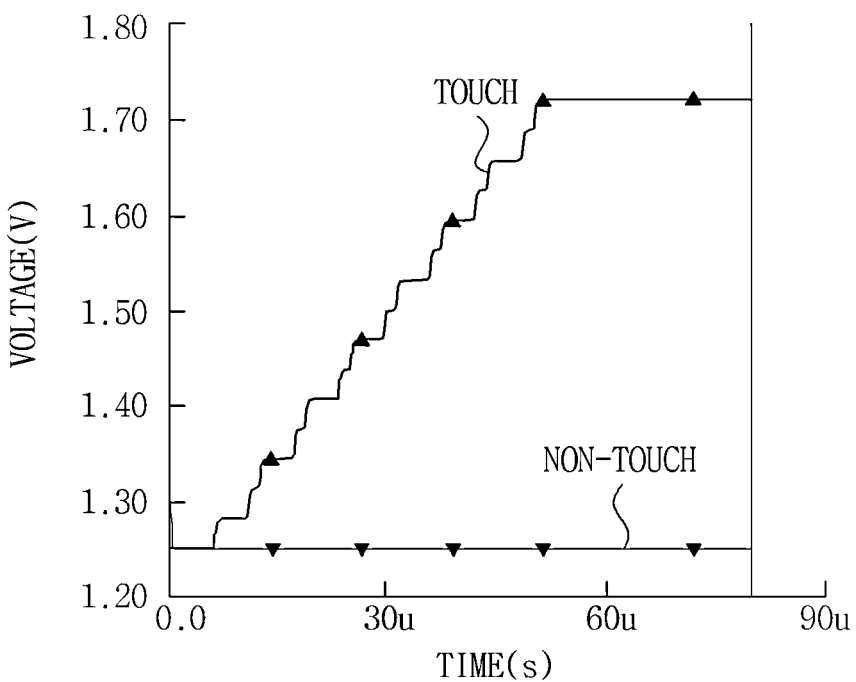
FIG. 5B is a diagram illustrating the output of the touch sensing apparatus according to the preferred embodiment of the present invention capable of supporting hover sensing illustrated in FIG. 1 at the time of applying the noise of 90 KHz/5 Vpp.

FIG. 5A is a diagram illustrating an output of a sensing apparatus according to the prior art at the time of applying a noise of 90 KHz/5 Vpp and FIG. 5B is a diagram illustrating the output of the touch sensing apparatus according to the preferred embodiment of the present invention capable of supporting hover sensing illustrated in FIG. 1 at the time of applying the noise of 90 KHz/5 Vpp.

The output voltage of the touch sensing apparatus according to the prior art illustrated in FIG. 5A is fluctuated due to noises, while it may be confirmed that the output voltage of the touch sensing apparatus capable of supporting hover sensing according to the preferred embodiment of the present invention illustrated in FIG. 5B is constant.

Figure 6:
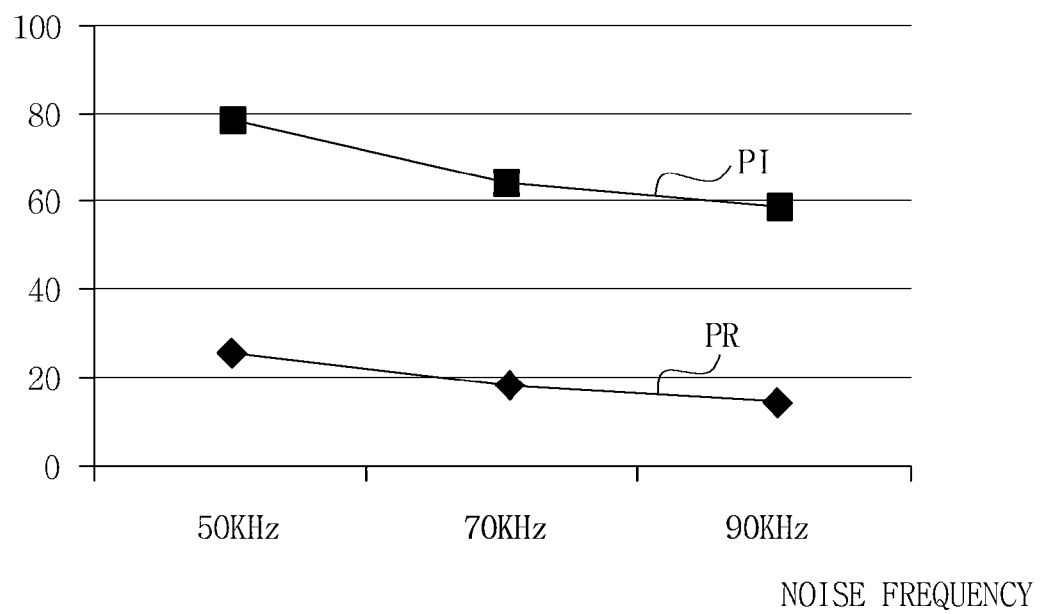
FIG. 6 is a comparison diagram of a signal-to-noise ratio (SNR) PR of the touch sensing apparatus according to the prior art and a signal-to-noise ratio PI of the touch sensing apparatus capable of supporting hover sensing according to the preferred embodiment of the present invention.

FIG. 6 is a comparison diagram of a signal-to-noise ratio PR of the touch sensing apparatus according to the prior art and a signal-to-noise ratio PI of the touch sensing apparatus capable of supporting hover sensing according to the preferred embodiment of the present invention. It can be appreciated that the signal-to-noise ratio of the touch sensing apparatus capable of supporting hover sensing according to the preferred embodiment of the present invention is much higher than the signal-to-noise ratio of the touch sensing apparatus according to the prior alt.

Figure 7:
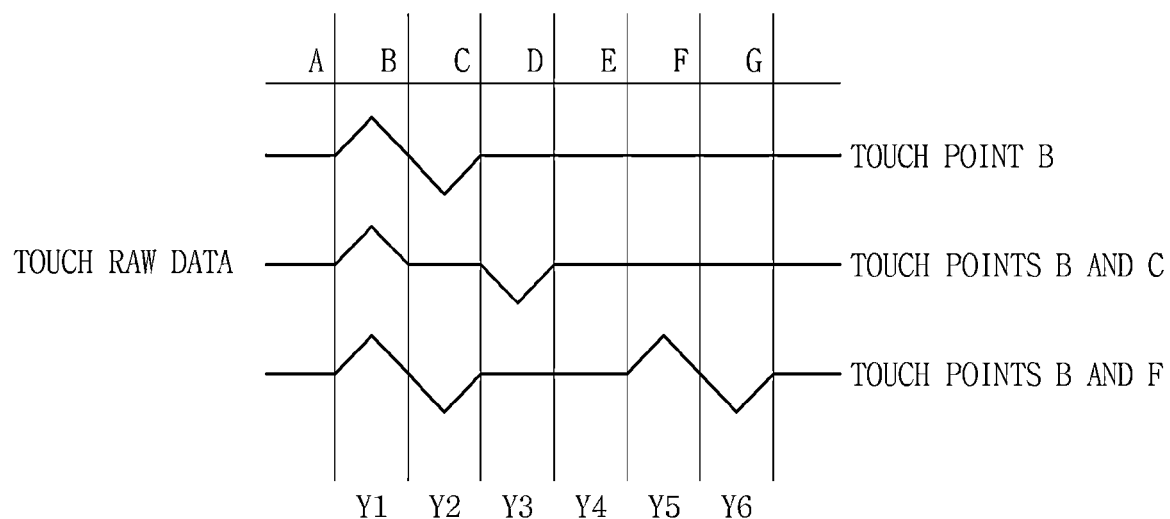
FIG. 7 is a diagram illustrating a touch raw data at the time of touching a node.
Figure 8:
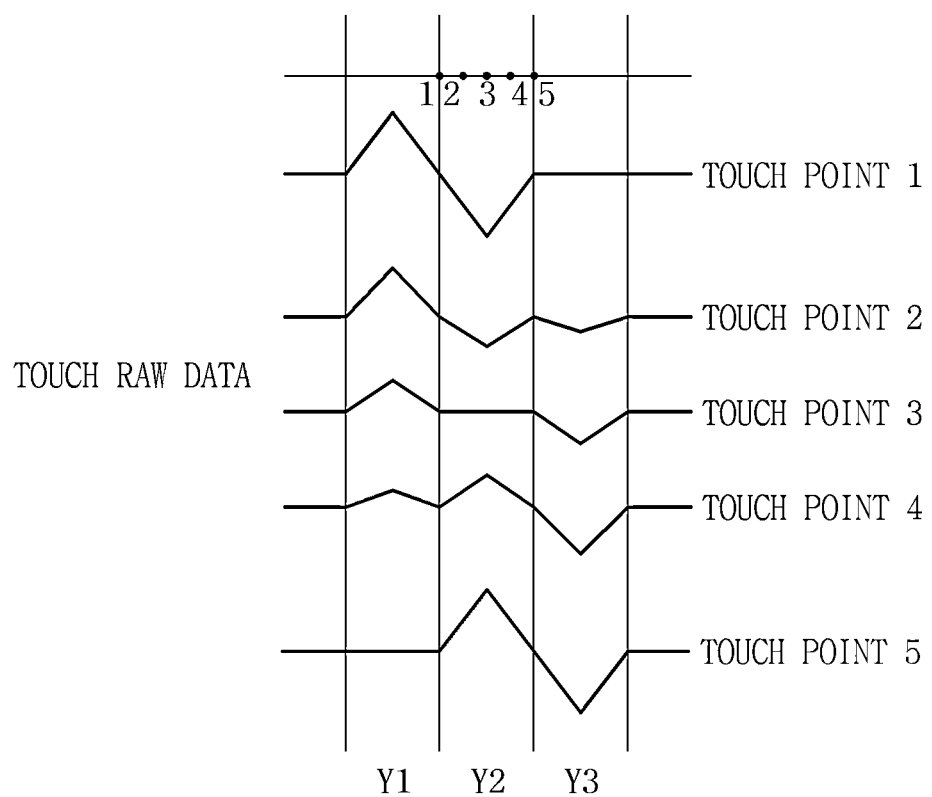
FIG. 8 is a diagram illustrating the touch raw data when a touch is made between the nodes.

FIG. 7 is a diagram illustrating a touch raw data at the time of touching a node, in the touch sensing apparatus capable of supporting hover sensing according to the preferred embodiment of the present invention and FIG. 8 is a diagram illustrating the touch raw data when a touch is made between the nodes.

As illustrated in FIGS. 7 and 8, even though the touch is made at any portion, it can be appreciated that the data processing may be smoothly made and thus the touch event may be accurately sensed.

Digital Mode Operation

The difference between the analog mode operation and the digital mode operation is that in the analog mode, the differential amplification units 124 and 126 subtract and amplify the signals of adjacent channels and then output the amplified signals to the analog-to-digital converters 128 and 130, while in the digital mode, the differential amplification units 124 and 126 sequentially subtract and amplify the reference voltage from the signal of one channel and then output the amplified reference voltage to the analog-to-digital converters 128 and 130. That is, in the digital mode, the subtraction of the signals of adjacent channels is not performed by the differential amplification unit, but performed in a lump by the digital signal processing unit 130.

Figure 9:
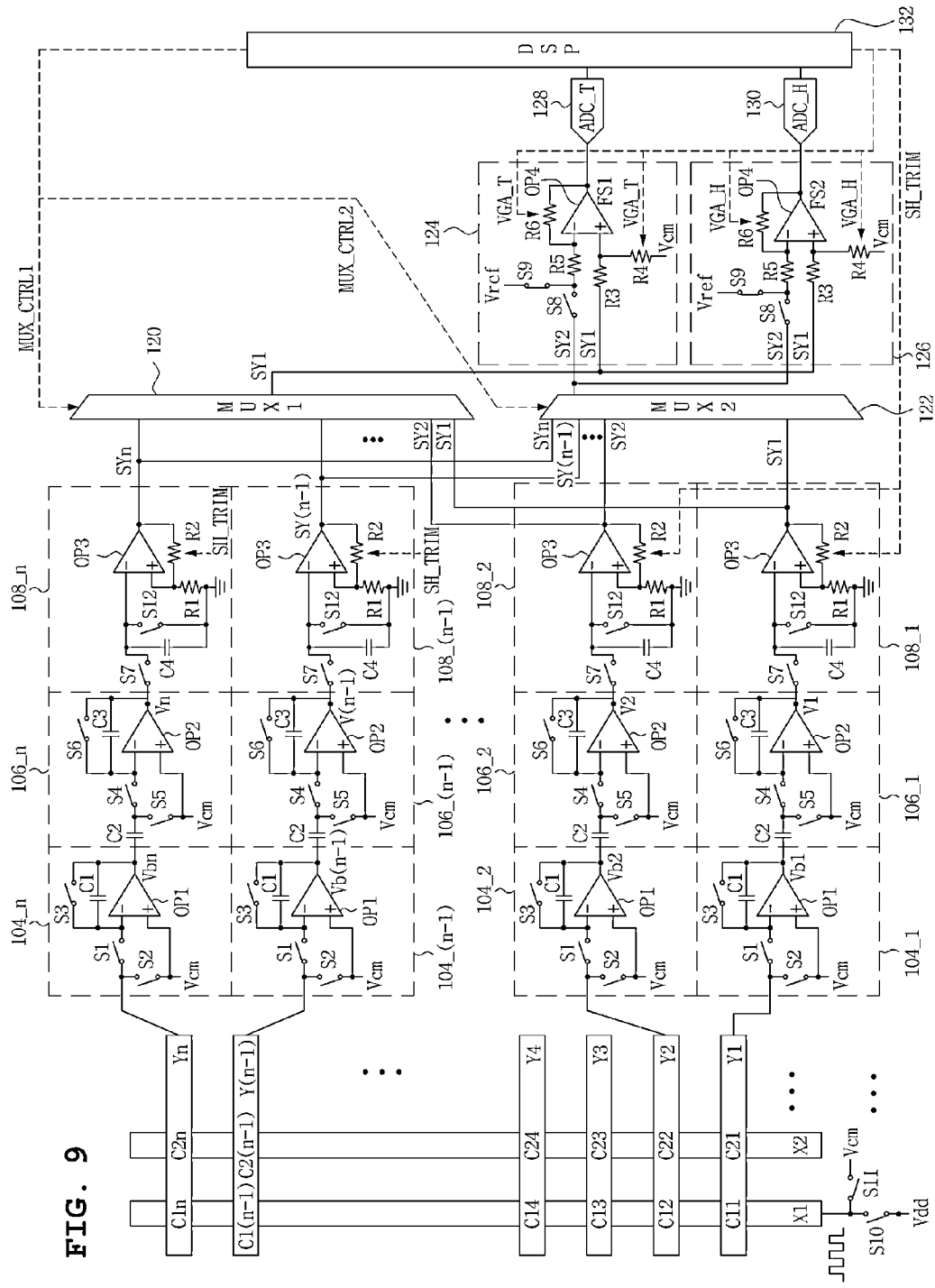
FIG. 9 is a block diagram of the touch sensing apparatus capable of supporting hover sensing according to the preferred embodiment of the present invention, which is operated in a digital mode.

FIG. 9 is a block diagram of the touch sensing apparatus capable of supporting hover sensing according to the preferred embodiment of the present invention, which is operated in a digital mode. As illustrated in FIG. 9, when the eighth switch S8 is opened and the ninth switch S9 is closed, the touch sensing apparatus capable of supporting hover sensing according to the preferred embodiment of the present invention is operated in the digital mode.

In the touch sensing apparatus capable of supporting hover sensing according to the preferred embodiment of the present invention which is operated in the digital mode illustrated in FIG. 9, in each of the differential amplification units 124 and 126, the number of data channels output to the digital signal processing unit 132 is the same as the total number of channels That is, when 40 channels are present, a total of 40 channel data are sequentially output from each of the differential amplification units 124 and 126 to the digital signal processing unit 132 at the time of the digital mode operation.

When in the digital mode, the touch event is generated, for example, when the C11 is touched, the first differential amplification unit 124 subtracts and amplifies a predetermined reference voltage Vref from the signal SY1 associated with the first channel and outputs the signal FS 1, as being represented by the following Equation 2.

$$FS1=(SY1-Vref)\times(R4/R3)+Vcm \quad \text{[Equation 2]}$$

In the above Equation 2, it is assumed that the third resistor R3 and the fifth resistor R5 have the same resistance value and the fourth resistor R4 and the sixth resistor R6 have the same resistance value and it is assumed that the Vcm is the predetermined first voltage.

The output FS1 of the first differential amplification unit 124 is input to the first analog-to-digital converter 128. The first analog-to-digital converter 128 converts the input analog touch signal into the digital data and outputs the converted digital data to the digital signal processing unit 132.

When the digital signal processing unit 132 receives all the input digital touch data of the adjacent channels, the digital signal processing unit 132 subtracts the digital touch data of the adjacent channels to remove the common noise. The digital signal processing unit 132 senses the touch event based on the data from which the common noise is removed.

Since in the digital mode, the digital signal processing unit 132 performs the subtraction between the signals of adjacent channels, the subtraction (for example, SY1-SY2) of the signals of adjacent channels and the subtraction (for example, SY1-SY3) of the signals of the channels spaced from each other by two channels may also be performed. Therefore, various operations may be performed based on the received channel data, and thus various touch sensing methods may be applied.

Meanwhile, when the digital signal processing unit 132 is operated in the digital mode, the digital signal processing unit 132 adjusts the predetermined reference voltage Vref applied to the differential amplification units 124 and 126 to be able to adjust the offset of each channel.

Further, when the hover event is generated, even though the change in capacitance is weak, the digital signal processing unit 132 subtracts the data associated with the signals of the adjacent channels based on the data input via the second differential amplification unit 126 and the second analog-to-digital converter 130 to remove the common noise so as to remove the affect due to noises, thereby accurately sensing the hover event.

Further, when the touch event is generated, since the signal level is high enough to differentiate the change in capacitance, the first differential amplification unit 124 which takes charge of the sensing of the touch event is operated at a low gain mode so as not to be in a saturated state, thereby accurately sensing the touch event.

Therefore, when the sensing apparatus according to the preferred embodiment of the present invention is operated in the digital mode, the sensing apparatus may accurately sense both the touch event and the hover event.

The digital signal processing unit 132 controls the eighth switch S8 and the ninth switch S9 based on the user selection to perform the analog mode operation or the digital mode operation.

As described above, according to the preferred embodiment of the present invention, the first differential amplification unit 124 which takes charge of the sensing of the touch event is operated in the low gain mode and the second differential amplification unit 126 which takes charge of the sensing of the hover event is operated in the high gain mode. As a result, when the touch event is generated, the second differential amplification unit 126 is in the saturated state and when the hover event is generated, the first differential amplification unit 124 does not sense the input signal since the input signal is weak.

Therefore, when the second differential amplification unit 126 is in the saturated state, the digital signal processing unit 132 determines that the touch event is generated so as to sense the touch event based on the signal output from the first differential amplification unit 124.

Further, when the signal output from the first differential amplification unit 124 is less than a first level and the signal output from the second differential amplification unit 126 is equal to or more than a second level, the digital signal processing unit 132 determines that the hover event is generated so as to sense the hover event based on the signal output from the second differential amplification unit 126.

Touch Sensing Method Capable of Supporting Hover Sensing

Figure 10:
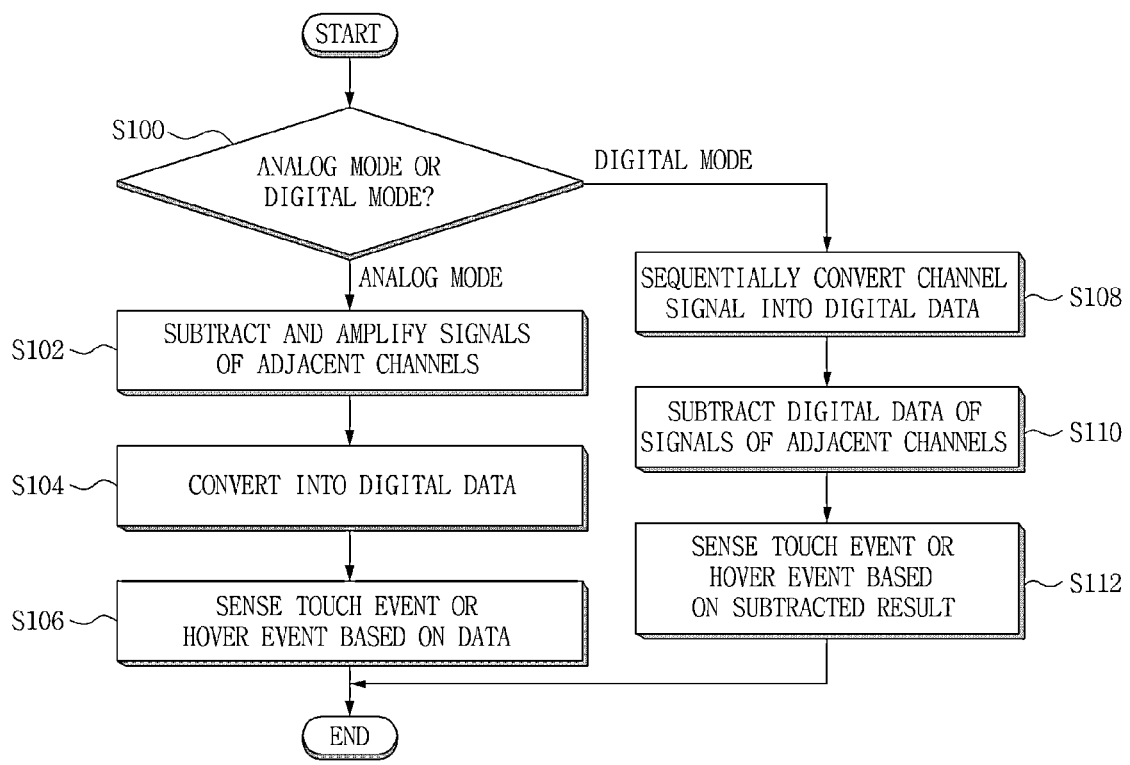
FIG. 10 is a flow chart of a touch sensing method capable of supporting hover sensing according to a preferred embodiment of the present invention.

FIG. 10 is a flow chart of a touch sensing method capable of supporting hover sensing according to a preferred embodiment of the present invention.

Hereinafter, the touch sensing method capable of supporting hover sensing according to the preferred embodiment of the present invention will be described with reference to FIG. 10.

In step S100, it is determined whether the mode selected by a user is an analog mode or a digital mode by the digital signal processing unit 132. A user may select whether the touch sensing apparatus capable of supporting hover sensing illustrated in FIG. 1 is operated in the analog mode or the digital mode and the digital signal processing unit 132 determines whether the mode selected by a user is the analog mode or the digital mode by sensing the user selection.

In step S100, when the digital signal processing unit 132 determines that the user selection is the analog mode, in step S102, the first differential amplification unit 124 and the second differential amplification unit 126 each subtract and amplify the signals of the adjacent channels input from the first multiplexer 120 and the second multiplexer 122 depending on the control signal of the digital signal processing unit 132.

In step S104, the first analog-to-digital converter 128 and the second analog-to-digital converter 130 each convert the outputs of the first differential amplification unit 124 and the second differential amplification unit 126 into the digital data. In step S106, the digital signal processing unit 132 senses the touch event or the hover event based on the input digital data.

Meanwhile, in step S100, when the digital signal processing unit 132 determines that the user selection is the digital mode, in step S108, the first differential amplification unit 124 and the second differential amplification unit 126 each subtract and amplify the signals of the channels which are sequentially input and the predetermined reference voltage, depending on the control signal of the digital signal processing unit 132 and the first analog-to-digital converter 128 and the second analog-to-digital converter 130 each convert the outputs of the first differential amplification unit 124 and the second differential amplification unit 126 into the digital data.

In step S110, when the digital signal processing unit 132 receives both the data of the adjacent channels, the digital signal processing unit 132 subtracts the digital data associated with the signals of the adjacent channels and in step S112, the digital signal processing unit 132 senses the touch event or the hover event based on the subtracted result.

The first differential amplification unit 124 is operated in the low gain mode and the second differential amplification unit 126 is operated in the high gain mode. When the second differential amplification unit 126 is in the saturated state, the digital signal processing unit 132 determines that the touch event is generated and senses the touch event based on the output of the first differential amplification unit 124 and when the output of the first differential amplification unit 124 is less than the first level and the output of the second differential amplification unit 126 is equal to or more than the output of the second level, the digital signal processing unit determines that the hover event is generated and senses the hover event based on the output of the second differential amplification unit 126.

The touch sensing method capable of supporting hover sensing according to the preferred embodiment of the present invention subtracts the signals of the adjacent channels to remove the common noise, thereby accurately sensing both the touch event and the hover event. Further, the touch sensing apparatus may be operated in the analog mode or the digital mode depending on the user selection.

The methods mentioned in the present specification may be implemented using various devices according to the application example. For example, these methods may be implemented by hardware, firmware, software, or in any combination thereof. In the implementation example accompanying the hardware, the control circuit or the control unit may be implemented by at least one application specific integrated circuit (ASICs), digital signal processors (DSPs), field programmable gate arrays (FPGAs), processors, controllers, micro-controllers, microprocessors, electronic devices, other electronic unit designed to execute functions mentioned in the present specification, or in a combination thereof.

According to the preferred embodiments of the present invention, both the touch event and the hover event can be accurately sensed by removing the common noise and can be operated in the analog mode or the digital mode depending on the user selection.

Although the embodiments of the present invention have been disclosed for illustrative purposes, it will be appreciated that the present invention is not limited thereto, and those skilled in the art will appreciate that various modifications, additions and substitutions are possible, without departing from the scope and spirit of the invention.

Accordingly, any and all modifications, variations or equivalent arrangements should be considered to be within the scope of the invention, and the detailed scope of the invention will be disclosed by the accompanying claims.

What is claimed is:

1. A touch sensing apparatus capable of supporting hover sensing of a touch panel including a plurality of driving electrodes and a plurality of sensing electrodes, comprising:
    a plurality of capacitance-voltage converters (C-V converters) outputting different voltage values depending on a change in capacitance of each of the sensing electrodes;
    a plurality of integrators integrating output voltages of each of the C-V converters;
    a first multiplexer multiplexing outputs of the plurality of integrators;
    a second multiplexer multiplexing the outputs of the plurality of integrators;
    a first differential amplification unit for touch sensing receiving an output of the first multiplexer and an output of the second multiplexer;
    a second differential amplification unit for hover sensing receiving the output of the first multiplexer and the output of the second multiplexer; and
    a control unit sensing a touch event or a hover event based on an output of the first differential amplification unit and an output of the second differential amplification unit.

2. The touch sensing apparatus as set forth in claim 1, wherein the first differential amplification unit for touch sensing is operated in a low gain mode and the touch sensing apparatus capable of supporting hover sensing is operated in a high gain mode.

3. The touch sensing apparatus as set forth in claim 2, wherein when the second differential amplification unit is in a saturated state, the control unit determines that the touch event is generated and senses the touch event based on the output of the first differential amplification unit and when the output of the first differential amplification unit is less than a first level and the output of the second differential amplification unit is equal to or more than a second level, the control unit determines that the hover event is generated and senses the hover event based on the output of the second differential amplification unit.

4. The touch sensing apparatus as set forth in claim 3, further comprising:
a plurality of sample and hold circuits holding the outputs of each of the integrators for a predetermined time, wherein the first multiplexer and the second multiplexer receive and multiplex the outputs of the plurality of sample and hold circuits.

5. The touch sensing apparatus as set forth in claim 4, wherein the first multiplexer and the second multiplexer each select and output one of the output signals of the plurality of sample and hold circuits.

6. The touch sensing apparatus as set forth in claim 5, wherein the first multiplexer and the second multiplexer select and output the outputs of the sample and hold circuits which process signals of adjacent sensing electrodes among the plurality of sensing electrodes.

7. The touch sensing apparatus as set forth in claim 6, wherein each of the sample and hold circuits includes a function of adjusting a channel offset of the plurality of sensing electrodes.

8. The touch sensing apparatus as set forth in claim 7, wherein each of the sample and hold circuits includes a non-inverting amplifier and the control unit adjusts an amplification factor of the non-inverting amplifier to adjust an output level so as to adjust the channel offset of the plurality of sensing electrodes.

9. The touch sensing apparatus as set forth in claim 8, further comprising:
a first analog-to-digital converter converting the output of the first differential amplification unit into a digital data and a second analog-to-digital converter converting the output of the second differential amplification unit into the digital data, wherein the control unit includes a digital signal processing unit which receives the output of the first analog-to-digital converter and the output of the second analog-to-digital converter to sense the touch event and the hover event.

10. The touch sensing apparatus as set forth in claim 9, wherein in an analog mode, the first differential amplification unit and the second differential amplification unit each subtract, amplify, and output signals of adjacent channels depending on a control signal of the digital signal processing unit, the first analog-to-digital converter and the second analog-to-digital converter each convert the outputs of the first differential amplification unit and the second differential amplification unit into the digital data, and the digital signal processing unit senses the touch event or the hover event based on the digital data, and
in a digital mode, the first differential amplification unit and the second differential amplification unit each subtract, amplify, and output a predetermined reference voltage and signals of channels sequentially input depending on the control signal of the digital signal processing unit, the first analog-to-digital converter and the second analog-to-digital converter each convert the outputs of the first differential amplification unit and the second differential amplification unit into the digital data, and the digital signal processing unit senses the touch event or the hover event based on the digital data.

11. The touch sensing apparatus as set forth in claim 10, wherein each of the C-V converters includes:
a first switch of which the one terminal is connected to the sensing electrode;
a second switch of which the one terminal is connected to the sensing electrode and the other terminal is applied with a predetermined first voltage;
a first operational amplifier of which the inverting input terminal is connected to the other terminal of the first switch and the non-inverting terminal is applied with the first voltage;
a first capacitor connected between the non-inverting input terminal and an output terminal of the first operational amplifier; and
a third switch connected to the first capacitor in parallel.

12. The touch sensing apparatus as set forth in claim 11, wherein each of the integrators includes:
a second capacitor of which the one terminal is connected to an output of the first operational amplifier;
a fourth switch of which the one terminal is connected to the other terminal of the second capacitor;
a fifth switch of which the one terminal is connected to the other terminal of the second capacitor and the other terminal is applied with the first voltage;
a second operational amplifier of which the inverting input terminal is connected to the other terminal of the fourth switch and the non-inverting terminal is applied with the first voltage;
a third capacitor connected between the non-inverting input terminal and an output terminal of the second operational amplifier; and
a sixth switch connected to the third capacitor in parallel.

13. The touch sensing apparatus as set forth in claim 12, wherein each of the sample and hold circuits includes:
a seventh switch of which the one terminal is connected to an output of the second operational amplifier;
a third operational amplifier of which the inverting input terminal is connected to the other terminal of the seventh switch;
a first resistor of which the one terminal is connected to a non-inverting input terminal of the third operational amplifier and the other terminal is connected to a ground;
a second resistor connected between the non-inverting input terminal and an output terminal of the third operational amplifier and having a resistance value changed depending on a control signal of the control unit;
a fourth capacitor connected between the non-inverting input terminal of the third operational amplifier and a ground; and
a switch connected to the fourth capacitor in parallel.

14. The touch sensing apparatus as set forth in claim 13, wherein the first differential amplification unit and the second differential amplification unit each include:
a third resistor of which the one terminal is connected to the output of the first multiplexer;
a fourth operational amplifier of which the non-inverting input terminal is connected to the other terminal of the third resistor;
a fourth resistor of which the one terminal is applied with the first voltage and the other terminal is connected to the non-inverting input terminal of the fourth operational amplifier and having a resistance value changed depending on the control signal of the control unit;

an eighth switch of which the one terminal is connected to the output of the second multiplexer;

a ninth switch of which the one terminal is applied with a predetermined reference voltage and the other terminal is connected to the other terminal of the eighth switch;

a fifth resistor of which the one terminal is connected to the other terminal of the eighth switch and the other terminal of the ninth switch and the other terminal is connected to the non-inverting input terminal of the fourth operational amplifier; and a sixth resistor connected between the non-inverting input terminal and an output terminal of the fourth operational amplifier and having a resistance value changed depending on the control signal of the control unit.

15. A touch sensing method capable of supporting hover sensing of a touch sensing apparatus including a plurality of capacitance-voltage converters (C-V converters) outputting different voltage values depending on a change in capacitance of each of the sensing electrodes, a plurality of integrators integrating output voltages of each of the C-V converters, a first multiplexer multiplexing outputs of the plurality of integrators, a second multiplexer multiplexing the outputs of the plurality of integrators, a first differential amplification unit for touch sensing receiving an output of the first multiplexer and an output of the second multiplexer, a second differential amplification unit for hover sensing receiving the output of the first multiplexer and the output of the second multiplexer, a first analog-to-digital converter converting the output of the first differential amplification unit into a digital data, a second analog-to-digital converter converting the output of the second differential amplification unit into the digital data, and a digital signal processing unit receiving the outputs of the first analog-to-digital converter and the second analog-to-digital converter to sense a touch event and a hover event, the touch sensing method comprising:

(A) determining whether the mode selected by a user is an analog mode or a digital mode by the digital signal processing unit;

(B) in the step (A), when it is determined that the mode selected by the user is the analog mode, subtracting, amplifying, and outputting, by each of the first differential amplification unit and the second differential amplification unit, input signals depending on a control signal of the digital signal processing unit;

(C) converting, by each of the first analog-to-digital converter and the second analog-to-digital converter, the outputs of the first differential amplification unit and the second differential amplification unit into the digital data;

(D) sensing, by the digital signal processing unit, the touch event or the hover event based on the digital data;

(E) in the step (A), when it is determined that the mode selected by the user is the digital mode, subtracting, amplifying, and outputting, by each of the first differential amplification unit and the second differential amplification unit, the input signals of the channels and a predetermined reference voltage, depending on a control signal of the digital signal processing unit;

(F) converting, by each of the first analog-to-digital converter and the second analog-to-digital converter, the outputs of the first differential amplification unit and the second differential amplification unit into the digital data; and (G) when the digital signal processing unit receives the data of the two channels, subtracting the data of the two channels and sensing the touch event or the hover event based on the subtracted result.

16. The touch sensing method as set forth in claim 15, wherein the first differential amplification unit is operated in a low gain mode and the second differential amplification unit is operated in a high gain mode.

17. The touch sensing method as set forth in claim 16, wherein when the second differential amplification unit is in a saturated state, the digital signal processing unit determines that the touch event is generated and senses the touch event based on the output of the first differential amplification unit and when the output of the first differential amplification unit is less than a first level and the output of the second differential amplification unit is equal to or more than a second level, the control unit determines that the hover event is generated and senses the hover event based on the output of the second differential amplification unit.

18. The touch sensing method as set forth in claim 17, wherein the touch sensing apparatus capable of supporting hover sensing further includes a plurality of sample and hold circuits holding the outputs of each of the integrators for a predetermined time and the first multiplexer and the second multiplexer receive and multiplex the outputs of the plurality of sample and hold circuits.

19. The touch sensing method as set forth in claim 18, wherein the first multiplexer and the second multiplexer select and output the outputs of the sample and hold circuits which process signals of adjacent sensing electrodes among the plurality of sensing electrodes, in the step (B), the first differential amplification unit and the second differential amplification unit each subtract, amplify, and output signals of adjacent channels output from the first multiplexer and the second multiplexer, and in the step (G), the two channels include the adjacent channels.

20. The touch sensing method as set forth in claim 19, wherein each of the sample and hold circuits includes a function of adjusting a channel offset of the plurality of sensing electrodes.

* * * * *